(12) United States Patent
Jami et al.

(10) Patent No.: US 10,496,894 B2
(45) Date of Patent: Dec. 3, 2019

(54) SYSTEM AND METHOD FOR TEXT LOCALIZATION IN IMAGES

(71) Applicant: Tata Consultancy Services Limited, Mumbai (IN)

(72) Inventors: Santosh Kumar Jami, Hyderabad (IN); Srinivasa Rao Chalamala, Hyderabad (IN); Krishna Rao Kakkirala, Hyderabad (IN); Balakrishna Gudla, Hyderabad (IN); Arun Kumar Jindal, Gurgaon (IN); Bala Mallikarjunarao Garlapati, Hyderabad (IN); Sachin Premsukh Lodha, Pune (IN); Ajeet Kumar Singh, Pune (IN); Vijayanand Mahadeo Banahatti, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 23 days.

(21) Appl. No.: 15/874,095

(22) Filed: Jan. 18, 2018

(65) Prior Publication Data

US 2018/0285675 A1 Oct. 4, 2018

(30) Foreign Application Priority Data

Mar. 31, 2017 (IN) .............................. 201721011736

(51) Int. Cl.
*G06K 9/00* (2006.01)
*G06K 9/32* (2006.01)
(Continued)

(52) U.S. Cl.
CPC ....... *G06K 9/3258* (2013.01); *G06K 9/00449* (2013.01); *G06K 9/00456* (2013.01);
(Continued)

(58) Field of Classification Search
CPC ............. G06K 9/3258; G06K 9/00456; G06K 9/00463; G06K 9/46; G06K 9/6202;
(Continued)

(56) References Cited

U.S. PATENT DOCUMENTS

| 6,909,805 B2 * | 6/2005 | Ma ..................... G06K 9/00456 382/170 |
| 8,094,973 B2 * | 1/2012 | Bernal ..................... G06T 1/00 382/298 |

(Continued)

OTHER PUBLICATIONS

Cüceloğlu, I. et al. "Detecting handwritten signatures in scanned documents," *19th Computer Vision Winter Workshop*, Feb. 3-5, 2014, Kitiny, Czech Republic; 6 pages.

(Continued)

*Primary Examiner* — Phuoc Tran
(74) *Attorney, Agent, or Firm* — Finnegan, Henderson, Farabow, Garrett & Dunner LLP (57) ABSTRACT

System and method for text localization in images are disclosed. In an embodiment, a line and graphic eliminated image is received. Further, horizontal projection is performed on rows of the image to obtain a first flag vector, the flag vector indicates whether there is text in each row. Furthermore, a number of run-lengths of consecutive 1's and 0's is computed in the first flag vector. Moreover, text lines is extracted in the image based on the computed number of run-lengths of consecutive 1's and 0's in the first flag vector. Also, vertical projection is performed on the text lines to obtain a second flag vector for the text lines. Further, a number of run-lengths of consecutive 1's and 0's is computed in the second flag vectors. Furthermore, text is localized in the image based on the computed number of run-lengths of consecutive 1's and 0's in the second flag vectors.

19 Claims, 6 Drawing Sheets

(51) Int. Cl.
  *G06K 9/62* (2006.01)
  *G06K 9/46* (2006.01)
  *H04N 1/00* (2006.01)
(52) U.S. Cl.
  CPC .......... *G06K 9/00463* (2013.01); *G06K 9/46* (2013.01); *G06K 9/6202* (2013.01); *G06K 9/6261* (2013.01); *G06K 2209/01* (2013.01); *H04N 1/00331* (2013.01)
(58) Field of Classification Search
  CPC ............. G06K 9/6261; G06K 9/00449; G06K 2209/01; H04N 1/00331
  See application file for complete search history.

(56) References Cited

U.S. PATENT DOCUMENTS 9,524,430 B1    12/2016  Cho
2015/0039637 A1  2/2015  Neuhauser et al.

OTHER PUBLICATIONS

Kim, S. et al. "Word Segmentation of Printed Text Lines Based on Gap Clustering and Special Symbol Detection," *Proceedings on 16th International Conference on Pattern Recognition*, Aug. 11-15, 2002, Quebec, Canada; 4 pages.
Jahan, M.C. et al. Locating Tables in Scanned Documents for Reconstructing and Republishing, *7th International Conference on Information and Automation for Sustainability* (ICIAfS), Dec. 22-24, 2014, Colombo, Sri Lanka; 6 pages.

\* cited by examiner

SYSTEM AND METHOD FOR TEXT LOCALIZATION IN IMAGES

PRIORITY CLAIM

This U.S. patent application claims priority under 35 U.S.C. § 119 to: India Application No. 201721011736, filed on Mar. 31, 2017. The entire contents of the aforementioned application are incorporated herein by reference.

TECHNICAL FIELD

The embodiments herein generally relate to text localization and, more particularly, to text localization in images.

BACKGROUND

Generally, an image refers to a digital image representing a document which includes a substantial amount of text. For example, an image may be generated by scanning a hard copy document, taking a photograph of a hard copy document, converting a text-based electronic document (e.g. a Word™ document) into an image format (e.g. PDF™), etc. Extracting information from these images has optical character recognition (OCR) problems which still prevent 100% recognition of black characters even on a white background. The problems are compounded when the text is superimposed on complex backgrounds with natural images or complex graphics. Many attempts to solve these problems have been performed on uncompressed still images. The existing methods in general utilize the characteristics of text including: 1) restricted character size, 2) text lines always appearing in clusters of vertical characters which are aligned horizontally, and 3) text usually having a high contrast with the background. Hence, the localization of text in the images may not be accurate.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides methods and systems for text localization in images are disclosed. In one aspect, a processor-implemented method includes steps of: receiving an image, wherein the image comprises at least one of lines, graphics and text; and removing the at least one of lines and graphics from the image to obtain the line and graphic eliminated image. Further, the method includes the steps of: performing horizontal projection on a plurality of rows of the line and graphic eliminated image to obtain a first flag vector for the plurality of rows, wherein the first flag vector indicates whether there is text in each of the plurality of rows; computing a number of run-lengths of consecutive 1's and 0's in the first flag vector; extracting a plurality of text lines in the line and graphic eliminated image based on the computed number of run-lengths of consecutive 1's and 0's in the first flag vector; performing vertical projection on a plurality of columns of each of the plurality of text lines to obtain a second flag vector for each of the plurality of text lines, wherein the second flag vector indicates whether there is text in each of the plurality of columns of each of the plurality of text lines; computing a number of run-lengths of consecutive 1's and 0's in the second flag vector of each of the plurality of text lines; and localizing text in the line and graphic eliminated image based on the computed number of run-lengths of consecutive 1's and 0's in the second flag vector of each of the plurality of text lines.

In another aspect, a system for text localization in images is disclosed. The system includes one or more memories; and one or more hardware processors, the one or more memories coupled to the one or more hardware processors, wherein the one or more hardware processors are configured to execute programmed instructions stored in the one or more memories to: receive an image, wherein the image comprises at least one of lines, graphics and text; and remove the at least one of lines and graphics from the image to obtain the line and graphic eliminated image. Further, the one or more hardware processors are configured to execute programmed instructions to: perform horizontal projection on a plurality of rows of the line and graphic eliminated image to obtain a first flag vector for the plurality of rows, wherein the first flag vector indicates whether there is text in each of the plurality of rows; compute a number of run-lengths of consecutive 1's and 0's in the first flag vector; extract a plurality of text lines in the line and graphic eliminated image based on the computed number of run-lengths of consecutive 1's and 0's in the first flag vector; perform vertical projection on a plurality of columns of each of the plurality of text lines to obtain a second flag vector for each of the plurality of text lines, wherein the second flag vector indicates whether there is text in each of the plurality of columns of each of the plurality of text lines; compute a number of run-lengths of consecutive 1's and 0's in the second flag vector of each of the plurality of text lines; and localize text in the line and graphic eliminated image based on the computed number of run-lengths of consecutive 1's and 0's in the second flag vector of each of the plurality of text lines.

In yet another aspect, a non-transitory computer-readable medium having embodied thereon a computer program for executing a method for text localization in images. The method includes steps of: receiving an image, wherein the image comprises at least one of lines, graphics and text; and removing the at least one of lines and graphics from the image to obtain the line and graphic eliminated image. Further, the method includes the steps of: performing horizontal projection on a plurality of rows of the line and graphic eliminated image to obtain a first flag vector for the plurality of rows, wherein the first flag vector indicates whether there is text in each of the plurality of rows; computing a number of run-lengths of consecutive 1's and 0's in the first flag vector; extracting a plurality of text lines in the line and graphic eliminated image based on the computed number of run-lengths of consecutive 1's and 0's in the first flag vector; performing vertical projection on a plurality of columns of each of the plurality of text lines to obtain a second flag vector for each of the plurality of text lines, wherein the second flag vector indicates whether there is text in each of the plurality of columns of each of the plurality of text lines; computing a number of run-lengths of consecutive 1's and 0's in the second flag vector of each of the plurality of text lines; and localizing text in the line and graphic eliminated image based on the computed number of run-lengths of consecutive 1's and 0's in the second flag vector of each of the plurality of text lines.

It should be appreciated by those skilled in the art that any block diagram herein represents conceptual views of illustrative systems embodying the principles of the present subject matter. Similarly, it is appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the drawings to reference like features and modules.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The present technique performs text localization in images. In an embodiment, the technique to text localization could be to use structural and location properties of the text in a scanned document for separating the text from graphics. In order to localize the text effectively, it is necessary to eliminate the unwanted objects from the scanned document. The unwanted objects in this case could be lines, graphics and noise pixels arising out of scanning. The following steps describe in brief how the text is localized.

Line, Graphic detection and removal: Geometric manipulations along with Hough transform is applied for line detection and removal. The larger objects considered to be the graphic parts which are masked out for further processing. The positions of these identified graphic parts are recorded. Thus, separation of graphic elements enables seamless text replacement. Removal of lines enables usage of optical character recognition.

Text localization: Once the line and graphics are removed, the text lines are located using pixel projection histograms and these lines are divided into words. Thus enables separation of words both in handwritten and printed text and text localization in documents having multiple fonts and font sizes.

Region of Interest Expansion: All the segmented words in a single text line constitute a single region of interest (ROI). ROI expansion involves scanning the image region both vertically and horizontally beyond the ROI till the obstruction is encountered.

The methods and systems are not limited to the specific embodiments described herein. In addition, the method and system can be practiced independently and separately from other modules and methods described herein. Each device element/module and method can be used in combination with other elements/modules and other methods.

The manner, in which the system and method for text localization in images, has been explained in details with respect to the FIGS. 1 through 6. While aspects of described methods and systems for text localization can be implemented in any number of different systems, utility environments, and/or configurations, the embodiments are described in the context of the following exemplary system(s).

Figure 1:
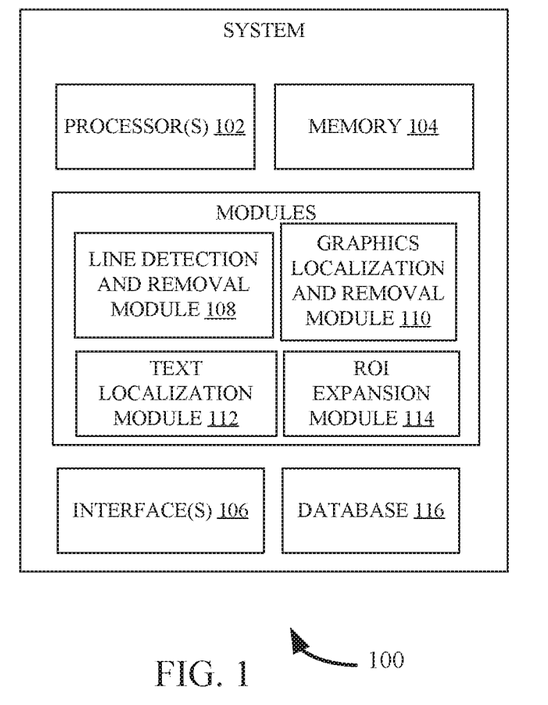
FIG. 1 illustrates a system for text localization in images, according to an embodiment of present disclosure.

FIG. 1 illustrates a block diagram of a system 100 for text localization in images (i.e., scanned images), in accordance with an example embodiment. In an example embodiment, the system 100 may be embodied in, or is in direct communication with a computing device. The system 100 includes or is otherwise in communication with one or more hardware processors such as processor(s) 102, one or more memories such as a memory 104, and a network interface unit such as a network interface unit 106. In an embodiment, the processor 102, memory 104, and the network interface unit 106 may be coupled by a system bus such as a system bus or a similar mechanism. Although FIG. 1 shows example components of the system 100, in other implementations, the system 100 may contain fewer components, additional components, different components, or differently arranged components than depicted in FIG. 1.

The processor 102 may include circuitry implementing, among others, audio and logic functions associated with the communication, and imaging, displaying, decoding and rendering functions. For example, the processor 102 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 102 thus may also include the functionality to encode messages and/or data or information. The processor 102 may include, among other things, a clock, an arithmetic logic unit (ALU) and logic gates configured to support operation of the processor 102. Further, the processor 102 may include functionality to execute one or more software programs, which may be stored in the memory 104 or otherwise accessible to the processor 102.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation DSP hardware, network processor, application specific integrated circuit (ASIC), FPGA, read only memory (ROM) for storing software, random access memory (RAM), and non-volatile storage. Other hardware, conventional, and/or custom, may also be included.

The interface(s) 106 may include a variety of software and hardware interfaces, for example, interfaces for peripheral device(s), such as a keyboard, a mouse, an external memory, and a printer. The interface(s) 106 can facilitate multiple communications within a wide variety of networks and protocol types, including wired networks, for example, local area network (LAN), cable, etc., and wireless networks, such as Wireless LAN (WLAN), cellular, or satellite.

The one or more memories such as a memory 104, may store any number of pieces of information, and data, used by the system to implement the functions of the system. The memory 104 may include for example, volatile memory and/or non-volatile memory. Examples of volatile memory may include, but are not limited to volatile random access memory. The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 104 may be configured to store information, data, applications, instructions or the like for enabling the system 100 to carry out various functions in accordance with various example embodiments. Additionally or alternatively, the memory 104 may be configured to store instructions which when executed by the processor 102 causes the system to behave in a manner as described in various embodiments. The memory 104 includes line detection and removal module 108, graphic removal module 110, text localization module 112, region of interest (ROI) expansion module 114 and/or other modules. The modules 108, 110, 112 and 114 include routines, programs, objects, components, data structures, etc., which perform particular tasks or implement particular abstract data types. The other modules may include programs or coded instructions that supplement applications and functions of the system 100.

In operation, the line detection and removal module 108 receives the scanned image. For example, the scanned image includes lines, graphics and text. The scanned image is an image of the document captured using scanners or cameras at good resolution. Further, the line detection and removal module 108 detects the lines in the image. In an example implementation, the line detection and removal module 108 converts the scanned image into a two level image (i.e., binarization). In an example, the line detection and removal module 108 converts the scanned or captured image in RGB format or any other format into gray format before converting the scanned image into the two level image. In this example implementation, the line detection and removal module 108 uses Ostu's method for the binarization. The Ostu's method makes the background pixel to 0 and foreground pixel to 1 of the scanned image. In this method, optimal threshold for binarization obtained by minimizing the intra class variance and maximizing the inter class variance of input gray image.

Furthermore, the line detection and removal module 108 extracts connected components in the two-level image. In this, the line detection and removal module 108 uses 8-neighborhood (8-connectivity) for connected components extraction. In this approach, a connected component means a pixel representing foreground (i.e., value '1') is connected to another pixel when the second pixel located in its 8-neighborhood/4-neighborhood with the value '1' (foreground). The input images is a background removed images containing lines, text and graphic elements In addition, the line detection and removal module 108 removes non-lines from the binarized image using the connected components. In this, the line detection and removal module 108 processes and rejects each connected component when it does not resemble a line. For this, two optimal thresholds are set based on size of document, height and width of connected components. The line detection and removal module 108 processes all connected components of document image by optimal threshold to remove non-lines such as text and graphic. Thus, the line detection and removal module 108 removes most of the non-line components (not all non-lines) and is further processed by Hough transform to detect robust lines.

Also, the line detection and removal module 108 uses Hough transform method to detect lines in the image upon removing most of the non-lines. Using Hough transform, the line detection and removal module 108 detects lines upon removing the most of the non-lines in the document image and stores their starting and ending locations and orientation angles. According to Hough transform method, a line can be drawn which is passing through an edge point of image in various orientations. Assume each edge point has lines which are passing through edge point in all orientations. Lines of each edge point could intersect the other edge point's line in any orientation, this intersection is also called as vote. A line has more votes in any orientation can be treated as line in image.

Further, the line removal detection and module 108 removes the detected lines in the image. For example, the lines include horizontal lines and vertical lines. In an example embodiment, the line detection and removal module 108 identifies line neighborhood along each of the detected lines. Further, the line detection and removal module 108 applies vertical projection on the identified line neighborhood along each of the detected lines. Furthermore, the line detection and removal module 108 applies histogram on the vertically projected line neighborhood to obtain a width of the associated line. Moreover, the line detection and removal module 108 performs horizontal edge detection on the line neighborhood along each of the detected lines. In addition, the line detection and removal module 108 removes the detected lines based on the horizontally detected edges and the width of the associated line. This is explained in more detailed with reference to FIG. 2.

Further in operation, the graphics localization and removal module 110 receives the line eliminated image and removes the graphics to obtain a line and graphic eliminated image. In an example implementation, the graphics localization and removal module 110 computes a number of active pixels for each of the connected components in the image (in case of binary image). Further, the graphics localization and removal module 110 identifies minimum and maximum pixel locations for each of the connected components. Furthermore, the graphics localization and removal module 110 determines area occupied by each of the connected components using the minimum and maximum pixel locations. Moreover, the graphics localization and removal module 110 computes a percentage of active area based on a ratio of the number of active pixels and the area occupied. In addition, the graphics localization and removal module 110 identifies largest active areas and the corresponding connected components that are graphics. Also, the graphics localization and removal module 110 removes the identified graphics and records co-ordinates of the identified graphics.

In another example implementation, the graphics localization and removal module 110 determines intensity values of pixels corresponding to the connected components (in case of gray image). Further, the graphics localization and removal module 110 determines standard deviation of the pixel intensities. Furthermore, the graphics localization and removal module 110 computed a ratio of size of the connected component and standard deviation. Also, the graphics localization and removal module 110 identifies the connected components having largest ratio as possible graphics. This is explained in more detail with reference to FIG. 3.

Furthermore in operation, the text localization module 112 receives the line and graphic eliminated image. The text localization module 112 then performs horizontal projection on a plurality of rows of the line and graphic eliminated image to obtain a first flag vector for the plurality of rows. For example, the flag vector indicates whether there is text in each of the plurality of rows of the line and graphic eliminated image. Further, the text localization module 112 computes a number of run-lengths of consecutive 1's and 0's in the first flag vector (the first flag vector indicates whether there is text in each of the plurality of rows). A run-length is the number of successive pixels in a given direction in a scanned image that belong to the same quantization interval. The length of a run is the number of pixels such a sequence contains. In the case of binary images, each run is either all black pixels (quantization value=0) or all white pixels (quantization value=1). Furthermore, the text localization module 112 extracts a plurality of text lines in the line and graphic eliminated image based on the computed number of run-lengths of consecutive 1's and 0's in the first flag vector. In an embodiment, the text localization module 112 eliminates objects in the line and graphic eliminated image based on the run-lengths of 1's in the first flag vector. For example, the objects include noise pixels. Furthermore, the text localization module 112 substantially simultaneously eliminates gaps (i.e., letter gaps or small gaps) in the line and graphic eliminated image based on the run-lengths of 0's in the first flag vector. In addition, the text localization module 112 identifies start and end positions of the plurality of text lines in the line and graphic eliminated image based on the run-lengths of 1's in the first flag vector upon eliminating the gaps and objects in the line and graphic eliminated image. In an example, the text localization module 112 separates areas in the image where run lengths of 1's are greater than a first threshold. The text localization module 112 then identifies the separated areas as the start and end positions of the plurality of text lines. Also, the text localization module 112 extracts the plurality of text lines based on the start and end positions of the text lines.

In some embodiments, the text localization module 112 determines whether one of the plurality of text lines include at least two words when a gap in the one of the plurality of text lines is greater than 1.5 time of mean of gaps in the one of the plurality of text lines. The text localization module 112 then recursively preforms the above steps on the each of the extracted words until entire text in the line and graphic eliminated image is localized. This is explained in more detail with reference to FIG. 5.

In addition, the text localization module 112 performs vertical projection on the plurality of text lines to obtain a second flag vector for the plurality of text lines. For example, the second flag vector indicates whether there is text in each column of a text line. Moreover, the text localization module 112 computes a number of run-lengths of consecutive 1's and 0's in the second flag vector. Also, the text localization module 112 localizes text in the line and graphic eliminated image based on the computed number of run-lengths of consecutive 1's and 0's in the second flag vector. In an embodiment, the text localization module 112 eliminates objects (small objects due to noise) in the plurality of text lines based on the run-lengths of 1's in the second flag vector. Further, the text localization module 112 substantially simultaneously eliminates gaps (letter or small gaps) in the plurality of text lines based on the run-lengths of 0's in the second flag vector. Furthermore, the text localization module 112 identifies start and end positions of the words and/or characters in the plurality of text lines based on the run-lengths of 1's in the second flag vector upon eliminating the gaps and objects in the plurality of text lines. In an example, the text localization module 112 separates areas in the plurality of text lines where run lengths of 1's are greater than a second threshold. The text localization module 112 then identifies the separated areas as the start and end positions of the words and/or characters. The text localization module 112 then extracts the words and/or characters in the plurality of text lines based on the corresponding start and end positions. This is explained in more detail with reference to FIG. 4.

In another embodiment, the ROI expansion module 114 identifies a region of interest (ROI) (i.e., localized text or segmented words in a single text line) in the line and graphic eliminated image. The ROI expansion module 114 then performs expansion of the ROI in at least one of vertical and horizontal directions. In an example embodiment, the ROI expansion module 114 expands the ROI (L→R)/(R→L) in the image with search space as a number of rows (number of rows covered by the ROI) and number of columns (number of columns from the point where the boundary of the ROI ends/starts (in case of R→L) till the remaining width of the image). In this embodiment, the ROI expansion module 114 traverses each row from L→R/R→L till the width of the image until a pixel with value 0 is encountered. The ROI expansion module 114 records the pixel location where the pixel with value 0 is encountered for each row (0 corresponds to text, 1 corresponds to background pixels values). Further, the ROI expansion module 114 finds the maximum/minimum (in case of R→L) y-coordinate value of all the pixel locations recorded above. Furthermore, the ROI expansion module 114 represents new boundary of the ROI by the vertical line passing through the maximum/minimum y-coordinate value recorded above. The height of this line is equal to the height of the block of segmented text.

In another example embodiment, the ROI expansion module 114 expands the ROI from upper (U)→lower (L)/lower (L)→upper (U)) in the image with search space as a number of rows: (number of rows from the point where the boundary ROI ends (in case of U→L)/starts (in case of L→U) till the remaining height of the image) and number of columns (number of columns covered by the length of the ROI). In this embodiment, the ROI expansion module 114 traverses each column from U→L/L→U till the remaining height of the image until a pixel with value 0 is encountered. The ROI expansion module 114 records the pixel location where the pixel with value 0 is encountered for each column. Further, the ROI expansion module 114 finds the maximum (in case of U→L)/minimum (in case of L→U) x-coordinate value of all the pixel locations recorded above. Furthermore, the ROI expansion module 114 represents new boundary of the ROI by the horizontal line passing through the maximum or minimum x-coordinate value recorded above. The width of this line is equal to the width of the ROI.

Figure 2:
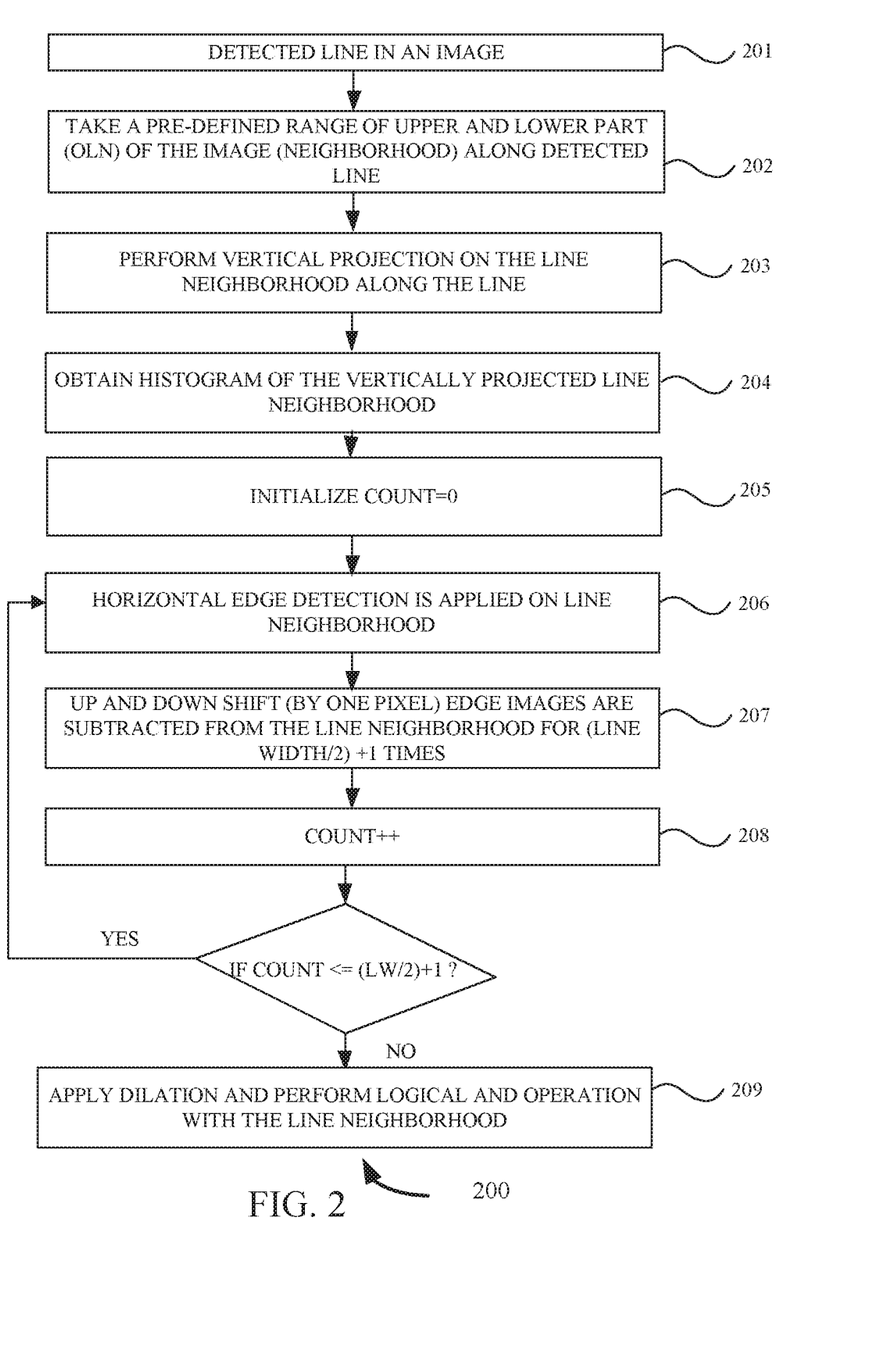
FIG. 2 is a flowchart illustrating a method for detection and removal of lines in an image, according to an embodiment of present disclosure.

FIG. 2 is a flowchart 200 illustrating a method for detection and removal of lines in an image. At block 201, a detected line in the image is received. At block 202, a pre-defined range of upper and lower part (OLN) of the image (neighborhood) along detected line is taken. At block 203, vertical projection is applied on the line neighborhood along the line. At block 204, histogram of the vertically projected line neighborhood is obtained. For example, a bin number which has maximum value in the histogram can be consider as approximate line location. At block 205, count is initiated to zero. At block 206, horizontal edge detection is applied on line neighborhood. At block 207, up and down shifted (by one pixel) edge images are subtracted from the line neighborhood for (line width/2)+1 times to remove the line completely. At block 208, the count is increased by 1. Further, a check is made to determine whether the count is less than or equal to (line width/2)+1. The process steps from block 206 are repeated if the count is less than or equal to (line width/2)+1. If the count is not less than or equal to (line width/2)+1, at block 209, dilation is applied on line removed image and logical AND operation is performed with OLN to preserve or reconstruct the character stroke which is connected to the line.

Figure 3:
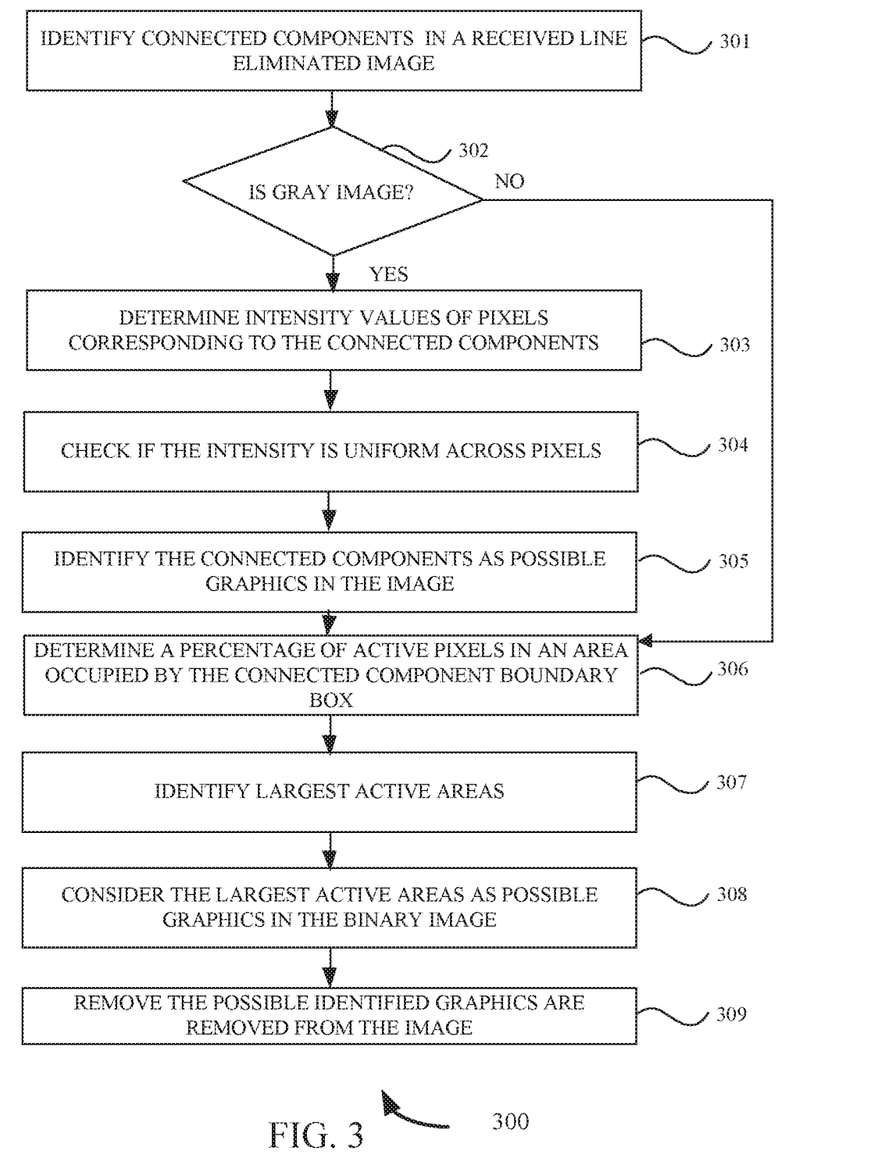
FIG. 3 is a flowchart illustrating a method for localization and removal of graphics in an image, according to an embodiment of present disclosure.

FIG. 3 is a flowchart 300 illustrating a method for localization and removal of graphics in an image, according to an embodiment of a present subject matter. At block 301, connected components are identified in a received line eliminated image. This involves identifying if there are any neighbors to each pixel starting from a randomly selected pixel. Repeating this procedure until all the pixels and their neighbors would give single connected component. For example, the pixels within each connected component are analyzed by deviation from centroid, number of pixels relative to other objects and by computing statistical moments.

At block 302, it is determined whether the received image is a gray image. If the received image is the gray image, at block 303, intensity values of pixels corresponding to the connected components is determined. At block 304, a check is made to determine whether the intensity values are uniform across the pixels in the connected components. If the intensity values are uniform across the pixels in the connected components, at block 305, the connected components are identified as possible graphics in the image. In an example embodiment, standard deviation of the pixel intensities is determined. Further, a ratio of size of the connected component and standard deviation is computed. Furthermore, the connected components having largest ratio are identified and considered as possible graphics. Intensity values of graphics would not change drastically. Hence, intensity is used as a parameter in deciding if a connected component a graphic.

If the image is not the gray image (i.e., binary image), then at block 306, a percentage of active pixels in an area occupied by the connected component boundary box is determined. At block 307, largest active areas are identified. In an example implementation, for each of the connected components, total number of active pixels is computed. Further, for each connected component object, minimum and maximum pixel locations are identified. Furthermore, area occupied by each of the connected component is determined using the minimum and maximum pixel locations. In addition, percentage of active area is determined by computing ratio of number of active pixels and area occupied At block 308, the largest active areas are considered as possible graphics in the binary image. In an example, a size of each connected component is determined by measuring width and height using extreme pixels. In some embodiments, a polygon is fitted to find the precise area. If the width and height are less than a threshold, then an object is considered small and are eliminated. If the size of the connected component is such that it larger in one dimension and smaller in other dimension, then it is assumed to be a line and removed. To find the larger objects first it is necessary to find the size of the object with respect to overall document size. If the object size is larger, then it is considered to be the graphic. Based on the below parameters an object in the scanned image is classified as a graphic if it has 1. Larger size, 2. Dense pixels, 3. Shape varying from text, line and 4. Uniform pixel intensities. Further, the position (co-ordinates) of the identified graphics is recorded. At block 309, the possible identified graphics are removed from the image.

Figure 4:
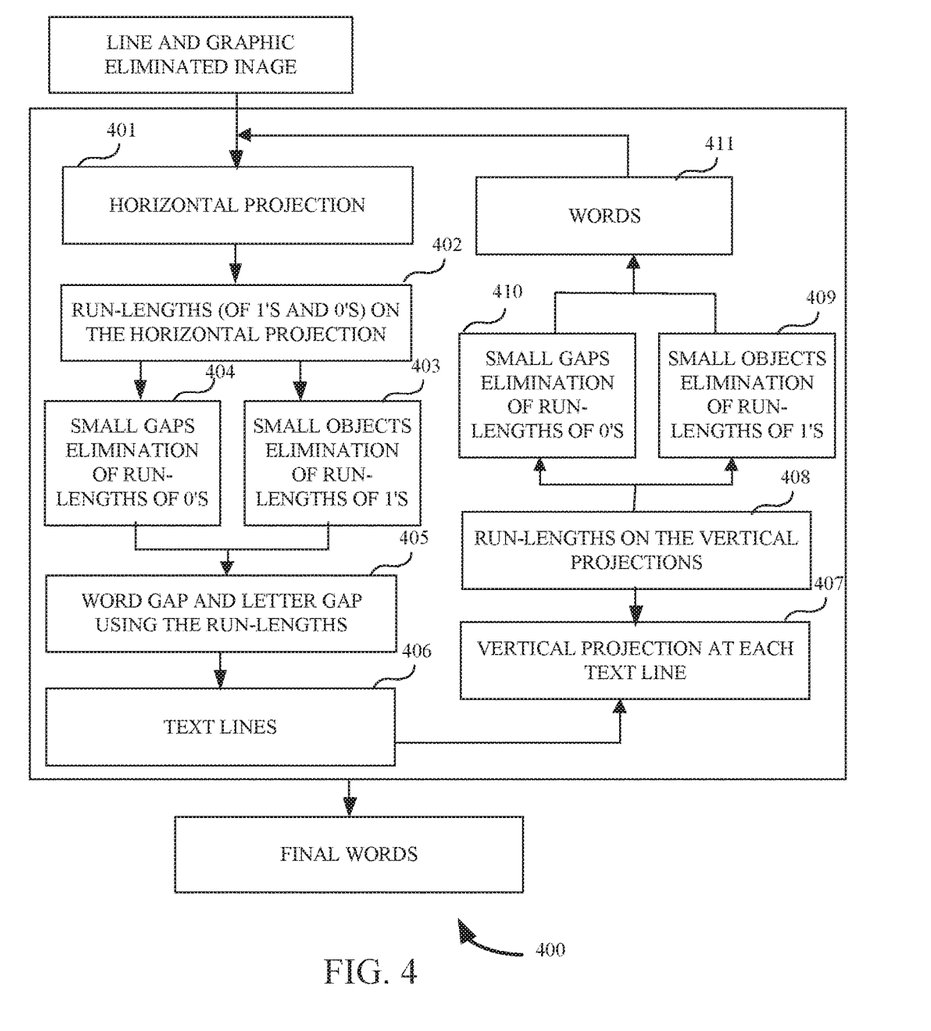
FIG. 4 is a flowchart illustrating a method for text localization in a line and graphic eliminated image, according to an embodiment of present disclosure.
Figure 5:
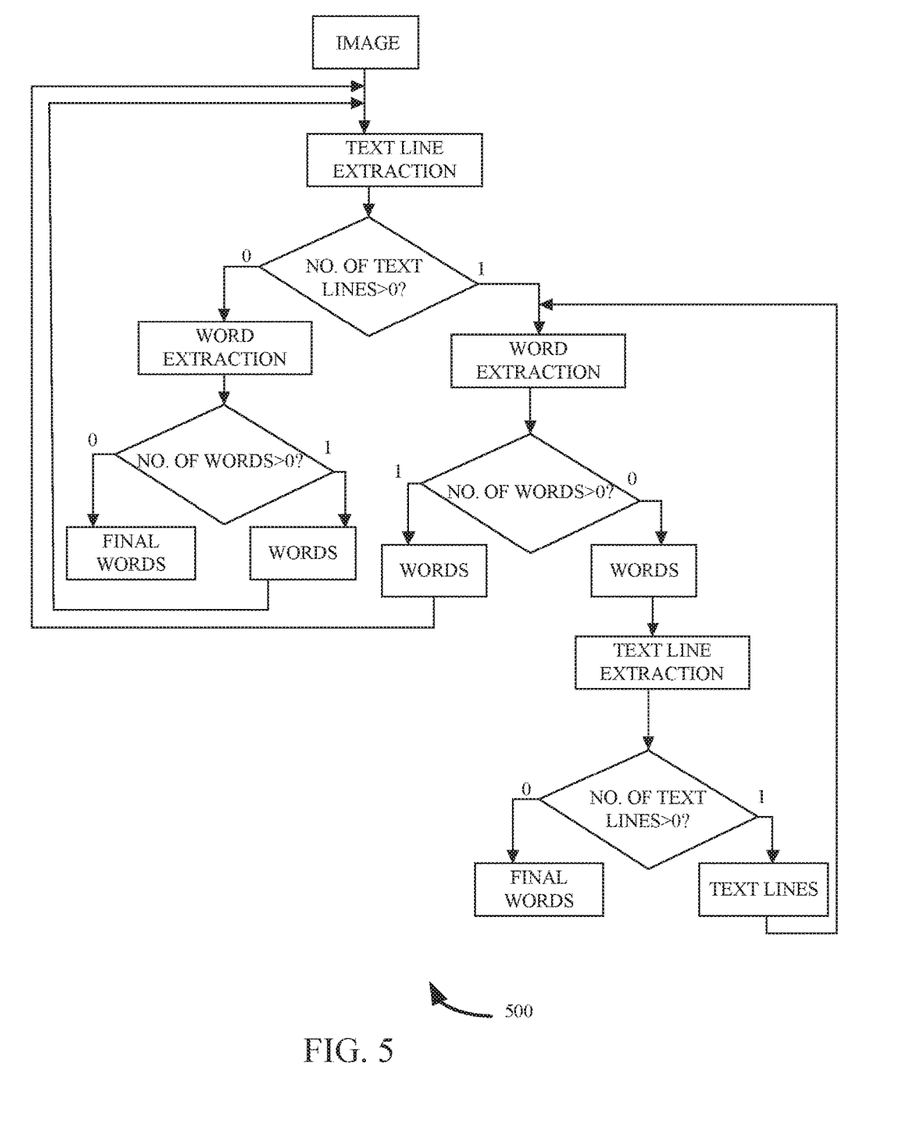
FIG. 5 is a flowchart illustrating a method for recursive extraction of words and/or lines in an image, according to an embodiment of present disclosure.

FIG. 4 is a flowchart 400 illustrating a method for text localization in a line and graphic eliminated image, according to an embodiment of a present subject matter. At block 401, a horizontal projection of a received image (i.e., a gray image) is performed. The horizontal projection represents whether number of black pixels or greater than a threshold or not at each row of the image. Repeat this on all the rows of the image which results a first flag vector that indicates if there is a text in each line. At block 402, a number of run-lengths of 1's and 0's (consecutive 1's and 0's) is computed in the first flag vector. At block 403, small objects are identified and removed. In an example, the first threshold value is 3 pixels as most of the times horizontal text lines are divided by minimum 3 pixel. At block 404, letter gaps and small gaps are identified and removed. In an example, if the run length of zeros is less than a second threshold then consider this as either letter gap or small gap and remove the gaps. In this example, if the run length of 1's is less than a first threshold then consider these as noise and discard noise. In this example, if the horizontal text line height is less than ¼th of image height, then the second threshold is 6 pixels otherwise the second threshold is horizontal text line height/30. At block 405, areas where run lengths of 1's are greater than the first threshold are separated and considered as starting and ending positions of horizontal text lines to be extracted. At block 406, the text lines are extracted based on these starting and ending positions of the text lines. In some embodiments, each text line is examined to check the multiple word availability. If there are multiple words in the text line, each text line is divided into temporary words as described in below paragraphs. Otherwise, complete text line is treated as temporary word and treated as new image and process is continued until all the words are divided.

At block 407, the vertical projection is performed on each text line to obtain a second flag vector. At block 408, run-lengths for each horizontal text line are computed using the second flag vector. At block 409, small objects are identified and removed. In an example, if the run length of 1's is less than a third threshold, then these are considered as noise and removed. In this example, it is assumed that the gap which is greater than 1.5 time of the mean gap (average of all gaps in horizontal text line) is a word gap. If the word gap exists, then do vertical division with the third threshold equal to ¼th of the height of the horizontal text line. At block 410, letter gaps and small gaps are identified and removed. In an example, if the run length of zeros is less than a fourth threshold, then this is considered as either letter gap or small gap and removed. In this example, the fourth threshold value is 3 pixels (if the gap is less than or equal to 3 pixels it can consider as intra word gap or letter gap). At block 411, areas where run lengths of 1's are greater than the third threshold are separated and considered as starting and ending positions of words or characters in that text line. In the above process, if input image is a binary document (considered to be noise less) noise removal step is not required. In some embodiments, the extracted words are considered as new images and above steps are repeated recursively on the resultant words until all the words are extracted. In the recursive process of horizontal text lines and words extraction, a word is considered as a final word if it does not satisfy both the conditions (text line>0 and word>0) otherwise it will goes to the loop again. This is shown in a flow chart 500 of FIG. 5.

Figure 6:
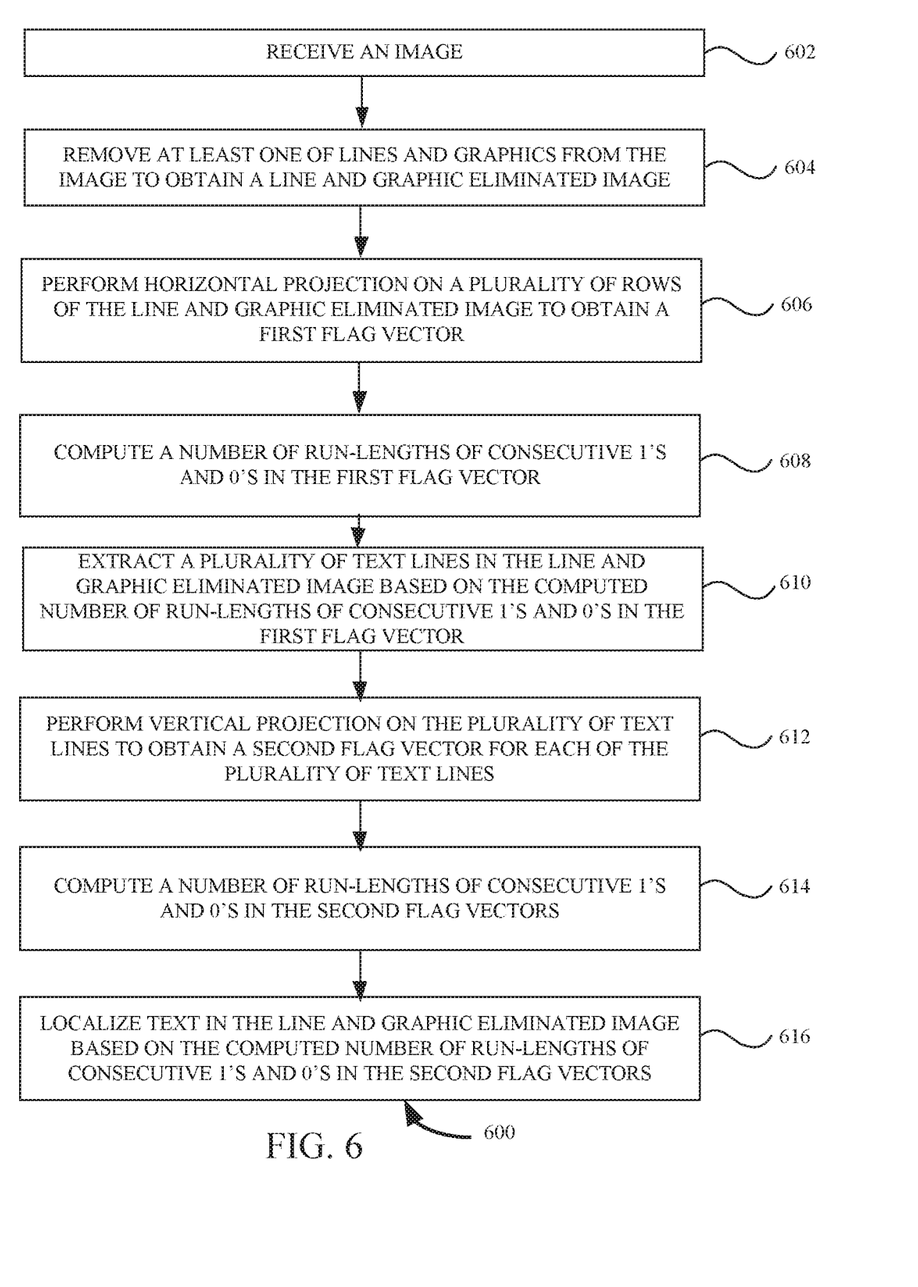
FIG. 6 is a flowchart illustrating a method for text localization in an image, according to an embodiment of present disclosure.

FIG. 6 illustrates a flow diagram of a method 600 for text localization in images, in accordance with an example embodiment. The processor-implemented method 600 may be described in the general context of computer executable instructions. Generally, computer executable instructions can include routines, programs, objects, components, data structures, procedures, modules, functions, etc., that perform particular functions or implement particular abstract data types. The method 600 may also be practiced in a distributed computing environment where functions are performed by remote processing devices that are linked through a communication network. The order in which the method 600 is described is not intended to be construed as a limitation, and any number of the described method blocks can be combined in any order to implement the method 600, or an alternative method. Furthermore, the method 600 can be implemented in any suitable hardware, software, firmware, or combination thereof. In an embodiment, the method 600 depicted in the flow chart may be executed by a system, for example, the system 100 of FIG. 1.

At block 602, an image is received. The image includes lines, graphics and/or text. At block 604, the lines and graphics are removed from the image to obtain the line and graphic eliminated image. At block 606, horizontal projection is performed on a plurality of rows of the line and graphic eliminated image to obtain a first flag vector for the plurality of rows, the first flag vector indicates whether there is text in each of the plurality of rows. At block 608, a number of run-lengths of consecutive 1's and 0's in the first flag vector is computed. At block 610, a plurality of text lines in the line and graphic eliminated image are extracted based on the computed number of run-lengths of consecutive 1's and 0's in the first flag vector. At block 612, vertical projection is performed on the plurality of text lines to obtain a second flag vector for the plurality of text lines. At block 614, a number of run-lengths of consecutive 1's and 0's in the second flag vector is computed. At block 616, text in the line and graphic eliminated image is extracted based on the computed number of run-lengths of consecutive 1's and 0's in the second flag vector. In some embodiments, it is determined whether one of the plurality of text lines include at least two words when a gap in the one of the plurality of text lines is greater than 1.5 time of mean of gaps in the one of the plurality of text lines. Then the above process steps are recursively preformed on the each of the extracted words until entire text in the line and graphic eliminated image is localized. In another embodiment, a region of interest is identified in the line and graphic eliminated image. Further, expansion of the region of interest is performed in at least one of vertical and horizontal directions, the region of interest expansion is comprised of segmented words in one of the plurality of text lines. This is explained in more detail with reference to FIGS. 1-5.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is, however to be understood that the scope of the protection is extended to such a program and in addition to a computer-readable means having a message therein; such non-transitory computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The foregoing description of the specific implementations and embodiments will so fully reveal the general nature of the implementations and embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

We claim:

1. A processor-implemented method comprising:
   receiving a line and graphic eliminated image;
   performing horizontal projection on a plurality of rows of the line and graphic eliminated image to obtain a first flag vector for the plurality of rows, wherein the first flag vector indicates whether there is text in each of the plurality of rows;
   computing a number of run-lengths of consecutive 1's and 0's in the first flag vector;
   extracting a plurality of text lines in the line and graphic eliminated image based on the computed number of run-lengths of consecutive 1's and 0's in the first flag vector;
   performing vertical projection on a plurality of columns of each of the plurality of text lines to obtain a second flag vector for each of the plurality of text lines, wherein the second flag vector indicates whether there is text in each of the plurality of columns of each of the plurality of text lines;
   computing a number of run-lengths of consecutive 1's and 0's in the second flag vector of each of the plurality of text lines;
   localizing text in the line and graphic eliminated image based on the computed number of run-lengths of consecutive 1's and 0's in the second flag vector of each of the plurality of text lines; and
   identifying a region of interest in the line and graphic eliminated image, wherein the region of interest is comprised of the localized text in one of the plurality of text lines; and
   performing expansion of the region of interest in at least one of vertical and horizontal directions for obtaining expanded boundary for the region of interest.

2. The method of claim 1, further comprising:
   receiving an image, wherein the image comprises at least one of lines, graphics and text; and
   removing the at least one of lines and graphics from the image to obtain the line and graphic eliminated image.

3. The method of claim 2, wherein removing the lines from the image, comprises:
   detecting lines in the image, wherein the lines comprise horizontal lines and vertical lines;
   identifying line neighborhood along each of the detected lines;
   applying vertical projection on the identified line neighborhood along each of the detected lines;
   applying histogram on the vertically projected line neighborhood to obtain a width of the associated line;
   performing horizontal edge detection on the line neighborhood along each of the detected lines; and
   removing the detected lines based on the horizontally detected edges and the width of the associated line.

4. The method of claim 3, further comprising:
   applying dilation on the image upon removing the lines and performing logical AND operation with the associated line neighborhood to preserve one or more character strokes connected to the corresponding line.

5. The method of claim 2, wherein removing the graphics from the image, comprises:
   identifying connected components in the image, wherein the image is a binary image;
   computing a number of active pixels for each of the connected components;
   identifying minimum and maximum pixel locations for each of the connected components;
   determining area occupied by each of the connected components using the minimum and maximum pixel locations;
   computing a percentage of active area based on a ratio of the number of active pixels and the area occupied;
   identifying largest active areas and the corresponding connected components that are possible candidates for graphics; and
   removing the identified graphics and recording co-ordinates of the identified graphics.

6. The method of claim 2, wherein removing the graphics from the image, comprises:
   identifying connected components in the image, wherein the image is a gray image;
   retrieving intensity levels of each of the connected components from the gray image;
   determining standard deviation of the pixel intensity levels;
   computing a ratio of size of each of the connected components and corresponding standard deviation;
   identifying one or more of the connected components having largest ratio as possible candidate for graphics; and
   removing the graphics and recording co-ordinates of the graphics.

7. The method of claim 1, wherein extracting the plurality of text lines in the line and graphic eliminated image based on the computed number of run-lengths of consecutive 1's and 0's in the first flag vector, comprises:
   eliminating objects in the line and graphic eliminated image based on the run-lengths of 1's in the first flag vector, wherein the objects comprise noise pixels;
   substantially simultaneously eliminating gaps in the line and graphic eliminated image based on the run-lengths of 0's in the first flag vector, wherein the gaps comprises letter gaps;
   identifying start and end positions of the plurality of text lines in the line and graphic eliminated image based on the run-lengths of 1's in the first flag vector upon eliminating the gaps and objects in the line and graphic eliminated image, wherein identifying the start and end positions of the plurality of text lines comprises steps of:
      separating areas in the line and graphic eliminated image where run lengths of 1's are greater than a first threshold; and
      identifying the separated areas as the start and end positions of the plurality of text lines; and
   extracting the plurality of text lines based on the start and end positions of the text lines.

8. The method of claim 1, wherein localizing the text in the line and graphic eliminated image based on the computed number of run-lengths of consecutive 1's and 0's in the second flag vector, comprises:
- eliminating objects in the plurality of text lines based on the run-lengths of 1's in the second flag vector, wherein the objects comprise noise pixels;
- substantially simultaneously eliminating gaps in the plurality of text lines based on the run-lengths of 0's in the second flag vector, wherein the gaps comprises letter gaps;
- identifying start and end positions of the words and/or characters in the plurality of text lines based on the run-lengths of 1's in the second flag vector upon eliminating the gaps and objects in the plurality of text lines, wherein identifying the start and end positions of the words and/or characters in the plurality of text lines comprises steps of:
  - separating areas in the plurality of text lines where run lengths of 1's are greater than a second threshold; and
  - identifying the separated areas as the start and end positions of the words and/or characters; and
- extracting the words and/or characters in the plurality of text lines based on the corresponding start and end positions.

9. The method of claim 8, further comprising:
determining whether one of the plurality of text lines include at least two words when a gap in the one of the plurality of text lines is greater than 1.5 time of mean of gaps in the one of the plurality of text lines.

10. The method of claim 8, further comprising:
recursively preforming the steps of claim 1 on the each of the extracted words until text in the line and graphic eliminated image is localized.

11. A system comprising:
one or more memories; and
one or more hardware processors, the one or more memories coupled to the one or more hardware processors, wherein the one or more hardware processors are configured to execute programmed instructions stored in the one or more memories to:
- receive a line and graphic eliminated image;
- perform horizontal projection on a plurality of rows of the line and graphic eliminated image to obtain a first flag vector for the plurality of rows, wherein the first flag vector indicates whether there is text in each of the plurality of rows;
- compute a number of run-lengths of consecutive 1's and 0's in the first flag vector;
- extract a plurality of text lines in the line and graphic eliminated image based on the computed number of run-lengths of consecutive 1's and 0's in the first flag vector;
- perform vertical projection on a plurality of columns of each of the plurality of text lines to obtain a second flag vector for each of the plurality of text lines, wherein the second flag vector indicates whether there is text in each of the plurality of columns of each of the plurality of text lines;
- compute a number of run-lengths of consecutive 1's and 0's in the second flag vector of each of the plurality of text lines;
- localize text in the line and graphic eliminated image based on the computed number of run-lengths of consecutive 1's and 0's in the second flag vector of each of the plurality of text lines; and
- identify a region of interest in the line and graphic eliminated image, wherein the region of interest is comprised of the localized text in one of the plurality of text lines; and
- perform expansion of the region of interest in at least one of vertical and horizontal directions for obtaining expanded boundary for the region of interest.

12. The system of claim 11, wherein the one or more hardware processors are further capable of executing programmed instructions to:
- receive an image, wherein the image comprises at least one of lines, graphics and text; and
- remove the at least one of lines and graphics from the image to obtain the line and graphic eliminated image.

13. The system of claim 12, wherein the one or more hardware processors are capable of executing programmed instructions to:
- detect lines in the image, wherein the lines comprise horizontal lines and vertical lines;
- identify line neighborhood along each of the detected lines;
- apply vertical projection on the identified line neighborhood along each of the detected lines;
- apply histogram on the vertically projected line neighborhood to obtain a width of the associated line;
- perform horizontal edge detection on the line neighborhood along each of the detected lines;
- remove the detected lines based on the horizontally detected edges and the width of the associated line; and
- apply dilation on the image upon removing the lines and performing logical AND operation with the associated line neighborhood to preserve one or more character strokes connected to the corresponding line.

14. The system of claim 11, wherein the one or more hardware processors are capable of executing programmed instructions to:
- identify connected components in the image;
- compute a number of active pixels for each of the connected components;
- identify minimum and maximum pixel locations for each of the connected components;
- determine area occupied by each of the connected components using the minimum and maximum pixel locations;
- compute a percentage of active area based on a ratio of the number of active pixels and the area occupied;
- identify largest active areas and the corresponding connected components that are graphics; and
- remove the identified graphics and recording co-ordinates of the identified graphics.

15. The system of claim 11, wherein the one or more hardware processors are capable of executing programmed instructions to:
- identify connected components in the image, wherein the image is a gray image;
- retrieve intensity levels of each of the connected components from the gray image;
- determine standard deviation of the pixel intensity levels;
- compute a ratio of size of each of the connected components and corresponding standard deviation;
- identify one or more of the connected components having largest ratio as possible candidate for graphics; and
- remove the identified graphics and recording co-ordinates of the identified graphics.

16. The system of claim 11, wherein the one or more hardware processors are capable of executing programmed instructions to:

eliminate objects in the line and graphic eliminated image based on the run-lengths of 1's in the first flag vector, wherein the objects comprise noise pixels;

substantially simultaneously eliminate gaps in the line and graphic eliminated image based on the run-lengths of 0's in the first flag vector, wherein the gaps comprises letter gaps;

identify start and end positions of the plurality of text lines in the line and graphic eliminated image based on the run-lengths of 1's in the first flag vector upon eliminating the gaps and objects in the line and graphic eliminated image; and extract the plurality of text lines based on the start and end positions of the text lines.

17. The system of claim 11, wherein the one or more hardware processors are capable of executing programmed instructions to:

eliminate objects in the plurality of text lines based on the run-lengths of 1's in the second flag vector, wherein the objects comprise noise pixels;

substantially simultaneously eliminate gaps in the plurality of text lines based on the run-lengths of 0's in the second flag vector, wherein the gaps comprises letter gaps;

identify start and end positions of the words and/or characters in the plurality of text lines based on the run-lengths of 1's in the second flag vector upon eliminating the gaps and objects in the plurality of text lines; and extract the words and/or characters in the plurality of text lines based on the corresponding start and end positions.

18. The system of claim 17, wherein the one or more hardware processors are further capable of executing programmed instructions to:

determine whether one of the plurality of text lines include at least two words when a gap in the one of the plurality of text lines is greater than 1.5 time of mean of gaps in the one of the plurality of text lines; and recursively preform the steps of claim 12 on the each of the extracted words until text in the line and graphic eliminated image is localized.

19. The non-transitory computer-readable medium having embodied thereon a computer program for executing a method comprising receiving a line and graphic eliminated image;

performing horizontal projection on a plurality of rows of the line and graphic eliminated image to obtain a first flag vector for the plurality of rows, wherein the first flag vector indicates whether there is text in each of the plurality of rows;

computing a number of run-lengths of consecutive 1's and 0's in the first flag vector;

extracting a plurality of text lines in the line and graphic eliminated image based on the computed number of run-lengths of consecutive 1's and 0's in the first flag vector;

performing vertical projection on a plurality of columns of each of the plurality of text lines to obtain a second flag vector for each of the plurality of text lines, wherein the second flag vector indicates whether there is text in each of the plurality of columns of each of the plurality of text lines;

computing a number of run-lengths of consecutive 1's and 0's in the second flag vector of each of the plurality of text lines;

localizing text in the line and graphic eliminated image based on the computed number of run-lengths of consecutive 1's and 0's in the second flag vector of each of the plurality of text lines; and identifying a region of interest in the line and graphic eliminated image, wherein the region of interest is comprised of the localized text in one of the plurality of text lines; and performing expansion of the region of interest in at least one of vertical and horizontal directions for obtaining expanded boundary for the region of interest.

* * * * *